April 23, 1968  C. L. NORK  3,379,885
SIGHT SWITCH USING AN INFRARED SOURCE AND SENSOR
Filed March 1, 1966

Charles L. Nork,
INVENTOR.

BY
Charles G. Phillips
ATTORNEY

United States Patent Office 3,379,885
Patented Apr. 23, 1968

3,379,885
SIGHT SWITCH USING AN INFRARED
SOURCE AND SENSOR
Charles L. Nork, Huntsville, Ala., assignor, by mesne assignments, to the United States of America as represented by the Administrator of the National Aeronautics and Space Administration
Filed Mar. 1, 1966, Ser. No. 530,958
8 Claims. (Cl. 250—83.3)

ABSTRACT OF THE DISCLOSURE

A control switch consisting of an infrared source and an infrared sensor mounted on a frame beside the wearer's eye. The device senses the level of reflected light from the corner of the wearer's eye. When the wearer rotates his eyeball by looking toward the light source, the level of reflected light changes and a switching action occurs.

---

The invention described herein was made in the performance of work under a NASA contract and is subject to the provisions of section 305 of the National Aeronautics and Space Act of 1958, Public Law 85-568 (72 Stat. 435; 42 U.S.C. 2457).

This invention relates to photoelectric control systems and particularly to a photoelectric control system wherein the human eye is in-circuit with the system.

Traditionally man can perform and control the performance of innumerable tasks by means of movement of his hands and limbs. Further, by means of certain voice-operated control techniques, he can achieve operation of devices by speaking. While in general, and in the case of most persons, and for most purposes, no other techniques beyond those described are needed or desired to assist one in most physical undertakings. It has been found and, it will be appreciated on reflection, that there are still many functions which particular persons, or persons particularly situated, cannot readily and conveniently accomplish in and by their hands or by other body movements, or by voice control. First, there are those persons who are physically handicapped to the extent of not having the use of their hands or limbs. Second, there are those that while having all of their normal faculties, are so engaged or otherwise constrained to be unable to effectively perform or control certain desired, to-be-performed tasks. For example, in the latter category would be included persons having both hands and, perhaps both feet, engaged in controlling machinery wherein additional output controls are needed of them.

The field of additional body control outputs available and which are not normally utilized include such things as breathing, tongue pressure and, as will be hereinafter described, eye movement.

It is the object of this invention to provide, that which, as stated by the title, is a sight switch. In so doing, the inventor solves in a novel fashion the problem of operating a switch by, in effect, looking at the switch, or more correctly, by the switch looking at one's eye.

In accordance with the invention, means are provided for directing a beam of invisible light at an angle from a line normal to the center of the iris (with the eye looking straight ahead) and capturing a portion of the light reflected by the eye by means of a light sensor selectively responsive to the invisible light being used and generally unresponsive to ambient light. With the eye looking straight ahead, the incident ray from the light source is substantially reflected from the relatively light colored eyeball to give a first level output from the light sensor. Next, with the eye turning to look in the direction of the light source, which is to one side and upward, the invisible light ray principally strikes the iris, which is dark. This produces a marked reduction in light level striking the sensor. This causes the electrical output of the sensor to change significantly and to change a control device such as a relay switch to which it is connected for effecting any desired control activity.

Other objects, features and advantages of the invention will be more clearly understood from the following description when considered together with the accompanying drawings in which.

Figure 1:
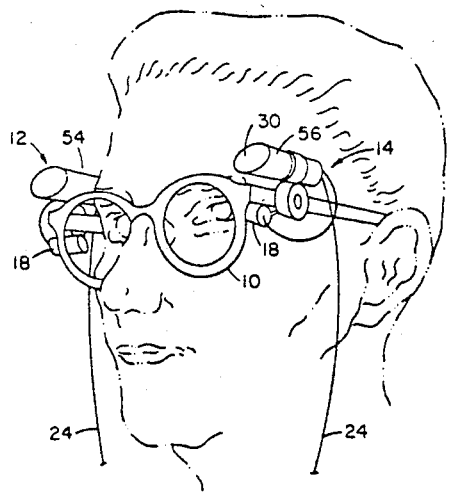
FIG. 1 is a pictorial view of an embodiment of the invention.
Figure 3:
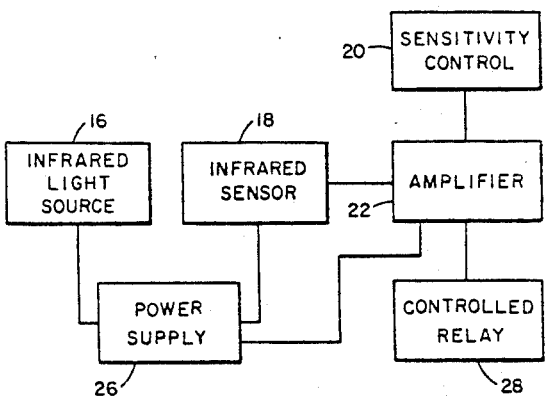
FIG. 3 is an electrical block diagram of the electrical system of the invention.
Figure 2:
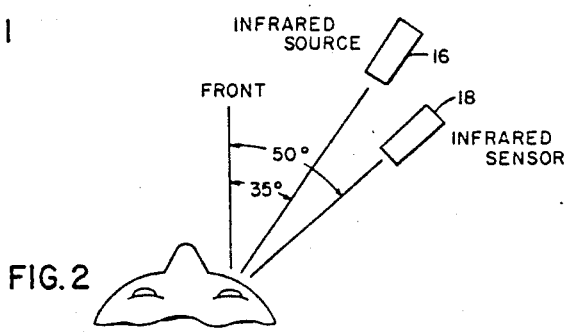
FIG. 2 is a schematic illustration of the geometric positioning of certain of the components of the embodiment of the invention shown in FIG. 1.

Referring now to the drawings, conventional eye glass frames 10 provide mounting support for sight switch assemblies 12 and 14 mounted adjacent to the right eye and left eye, respectively. Each of the assemblies consists of an invisible infrared light source 16, infrared light sensor 18, sensitivity control 20, and amplifier 22. Cable assembly 24 connects light switch assembly 14, for example, to power supply 26 and external controlled relay 28.

Infrared light source 16 is mounted and positioned to direct the center of emitted light from a position approximately 35 degrees to one side of a line normal to the front center of the eye and is aimed so that the area of illumination is approximately one square inch about the eye. Sensitivity control 20 adjusts the threshhold of operation and permits "sight switch" operation in varying ambient light conditions. Infrared source 16 is filtered by an infrared high-pass filter 30, so that no visible light is emitted. In this fashion no light from source 16 is perceived by the eye. Since the human eye is totally insensitive to low power radiation in the near infrared band, no stimuli is felt by the eye if proper filtering is employed. Infrared radiation from the source is reflected from the white of the eyeball, the eyelid, the malar area of the skull, the zygometic arch, the forehead and, to a small degree, from the tear-wet surface of the eyeball.

Infrared sensing element, or sensor 18, is a cadmium selenide detector and is mounted on eye glass frames 10 with the center of responsive area positioned approximately 50 to 60 degrees to the same side as source 14 from a line normal to the front center of the eye with which it is associated. Sensor 18 is aimed so that its field of view is the center of the field of source 16. In general, the sensor's field of view is limited to a .125 inch diameter field when measured at the eye and generally includes the upper portion of the eye. The relation between the source and the sensor must be properly maintained so that the infrared energy is properly reflected into the sensor when the eye is not looking at the sensor. In some instances it may be necessary to place an infrared filter over the light input of sensor 18 but in general it has been found that such is unnecessary. As stated above, power supply 26, consisting of basic power source 32 (e.g., a 12-volt battery), and bias source 34 (e.g., a 6-volt battery) supply power to light source 16 and amplifier 22, and provides an energized input from sensor 18 to amplifier 22. Power supply 26 may be in the form of a portable battery power source carried by the operator, or a separately mounted power supply.

Amplifier 22 is used to amplify the sensor output current sufficiently to provide an output to controlled relay 28. The circuit logic is such that controlled relay 28 is not operated when sensor 18 is receiving significant reflected light, as when light is being reflected from source 16 to sensor 18 by the white of an eyeball. Amplifier 22, a transistor amplifier, is interconnected to sensor 18 and biased in an appropriate and conventional mode to cause controlled relay 28 to operate only when the operator's eye is turned toward the sensor 18 associated with that eye and thus, when that sensor "sees" the iris of that eye.

Figure 4:
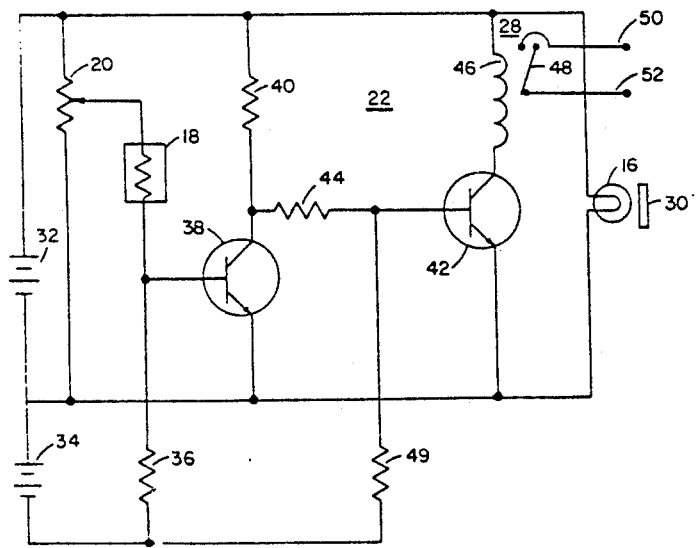
FIG. 4 is a schematic circuit diagram of the electrical system of FIG. 3.

In operation, assume that the right eye of the wearer of sight switch assembly 12 is positioned to look straight ahead. Thus, the light path from source 16 to the eye of the wearer and reflective path back to sensor 18 provides a "high" level of intensity or magnitude of light transmission. This follows since the white of the eyeball is largely the reflective area involved. The result is that the electrical resistance of sensor 18 is at a reduced level to cause a maximum forward bias (set in conjunction with bias control resistor 36) to be impressed on the base input of transistor 38 (FIG. 4). This in turn decreases the output potential at the collector of transistor 38 producing minimum current flow through resistor 40 and forward current through the base of transistor 42. This results in a minimum collector current flow through transistor 42 and relay coil 46 of controlled relay 28. Relay contacts 48 of controlled relay 28, and associated with relay coil 46, assume or remain in their unenergized and open mode position as shown in FIGURE 4. The operating point of bias for transistor 42 is set by means of a voltage divider circuit consisting of resistors 40, 44 and 49.

If the right eye of the wearer of sight switch assembly 12 is shifted to look to the right upward and thus, towards sight switch assembly 12, there occurs a decrease in reflected light received by sensor 18 because of the dark area of the iris of the eye now being present in the light path. This causes the electrical resistance of sensor 18 to increase and the forward bias current to transistor 38 to decrease. This then increases the collector output potential at the collector of transistor 38 and produces an increased forward bias current through transistor 42. The result is that the collector current of transistor 42 increases through coil 46 causing relay contacts 48 to be energized and operated to a closed position, closing the circuit through control leads 50 and 52. In this manner any desired external function which can be controlled by an electrical on-off switching function can be achieved by appropriate coupling to leads 50 and 52.

To accommodate varying ambient light conditions, the threshold of operation of sight switch assemblies may be adjusted by varying sensitivity control 20. By adjusting sensitivity control 20 to increase the output bias potential supplied through sensor 18 to the base input of transistor 38, a greater shift of reflective condition will be necessary to achieve a switching action and vice versa. Thus, in a relatively light ambient situation, a lower bias setting of sensitivity control 20 may be necessary than in a relatively dark light situation.

It has been discovered that the infrared reflectivity of the eyelid and eyeball are nearly the same and thus, unintentional actuation of the sight switch by eyelid blinking will not normally occur. Further, merely shifting the sight toward the side of the sight switch without the added, and normally intentional act of raising the angle of view, will not trip the switch. Thus, normal side glances cause no trouble. Simple 12 or 6-volt lamps can be used for light source 16 with light output through infrared filter 30. Light source 16 and filter 30, together with amplifier 22 and sensitivity control 20 for each sight switch, are contained in small tubes 54 and 56 which in turn are attached to eye glass frames 10. Alternatively, the sight switch elements may be mounted on a special hat, harness, or helmet, or other device appropriately positioning the sightswitch assemblies with respect to the eyes of the wearer.

The operation of left eye sight switch assembly 14 is identical to right eye sight switch assembly 12 with the exception, of course, that sight switch assembly 14 is operated by eye movement to the left instead of to the right. By employing both sight switch assemblies, the wearer can, of course, effect one sight switch action by looking to the left and another sight switch action by looking to the right. While the sight switch basically is an on-off device, analog control of it may also be achieved by the proper use of time modulation. For example, means may be provided for sensing the period of time between sight switching occurrences, or, the period of time that a sight switch is being continuously looked at.

It is appreciated and understood that the aforementioned specific examples of the invention are not intended to limit the scope of the invention and that various changes may be made in components and arrangement of components without departing from the invention as set forth in the following claims.

I claim:

1. An eye-position responsive switching system comprising:
    (A) mounting means adapted to be supported by the head of a person;
    (B) a source of invisible light supported by said mounting means and positioned to illuminate an eye of the wearer of said mounting means, the illumination being directed from a point positioned to the side of the forward view of the wearer corresponding to the side of the eye so illuminated;
    (C) photoelectric means supported by said mounting means and comprising means selectively responsive to rays of radiation of said invisible light reflected from said eye in a direction to the said side of the forward view of the wearer for providing a first electrical output responsive to light above a predetermined level of magnitude and for providing a second electrical output responsive to light below said predetermined level of magnitude.

2. The switching system set forth in claim 1 further comprising relay means connected to said photoelectric means for providing a first relay switching mode responsive to said first electrical output and for providing a second relay switching mode responsive to said second electrical output.

3. The switching system set forth in claim 2 wherein said source of invisible light is positioned to direct illumination having a center path which forms a first angle with a line normal to the center of the said eye of the wearer, which is a smaller angle than a second angle between said line normal and a line of direction extending along the center of the sight path of said photoelectric means.

4. The switching system set forth in claim 3 wherein said source of invisible light comprises means for providing light no lower in frequency than the infrared light band.

5. The switching system set forth in claim 4 wherein said source of invisible light comprises means for providing invisible light substantially in the near infrared band.

6. The switching system set forth in claim 5 wherein said line of direction extending along the center of the sight path of said photoelectric means extends upward from the upper portion of said eye to said photoelectric means.

7. The switching system set forth in claim 6 wherein said first angle is in the approximate range of 30 to 40 degrees and said second angle is in the approximate range of 50 to 60 degrees.

8. The switching system set forth in claim 7 further comprising amplification means coupling said photoelectric means and said relay means.

References Cited

UNITED STATES PATENTS

Re. 197 8/1956 Skolnick et al.

ARCHIE R. BORCHELT, *Primary Examiner.*